United States Patent [19]
Campbell

[11] Patent Number: 5,435,715
[45] Date of Patent: Jul. 25, 1995

[54] MULTI-STATION INJECTION MOLDING APPARATUS

[76] Inventor: Gerald D. Campbell, 1148 W. Fremont St., Stockton, Calif. 95203

[21] Appl. No.: 967,191
[22] Filed: Oct. 26, 1992
[51] Int. Cl.6 ............................................. B29C 45/06
[52] U.S. Cl. ..................................... 425/576; 425/589
[58] Field of Search ............... 425/574, 575, 576, 540, 425/589, 150, 593

[56] References Cited

U.S. PATENT DOCUMENTS

| | | | |
|---|---|---|---|
| 3,156,014 | 11/1964 | Wenger | 425/589 |
| 3,407,443 | 10/1968 | Beebee et al. | |
| 3,752,625 | 8/1973 | Van Manen | |
| 3,806,296 | 4/1974 | Aoki | |
| 3,832,110 | 8/1974 | Hehl | |
| 3,833,329 | 9/1974 | Ulmachneider et al. | 425/576 |
| 3,856,454 | 12/1974 | Aoki | |
| 3,914,081 | 10/1975 | Aoki | |
| 3,990,827 | 11/1976 | Maroschak | 425/150 |
| 3,993,787 | 11/1976 | Nakabayashi | |
| 4,105,391 | 8/1978 | Aoki | |
| 4,124,343 | 11/1978 | Makinson et al. | |
| 4,165,959 | 8/1979 | Dechavanne | |
| 4,370,124 | 1/1983 | Buja | |
| 4,376,744 | 3/1983 | Desantis | 425/593 |
| 4,424,015 | 1/1984 | Black et al. | |
| 4,457,689 | 7/1984 | Aoki | |
| 4,604,045 | 8/1986 | Black | |
| 4,613,475 | 9/1986 | Hettinga | |
| 4,652,227 | 3/1987 | Aoki | |
| 4,744,741 | 5/1988 | Glover et al. | |
| 4,750,875 | 6/1988 | Shiina | |
| 4,846,661 | 7/1989 | Nakamura et al. | |
| 4,941,816 | 7/1990 | Aoki | |
| 4,946,367 | 8/1990 | Nakamura | |

FOREIGN PATENT DOCUMENTS

| | | | |
|---|---|---|---|
| 753158 | 2/1967 | Canada | 425/576 |

OTHER PUBLICATIONS

Austria–2F and Multicolour–Engle.
Japan–Double Shot Series, Injection Molding Machine–Sumitomo.
Canada–Molding Machine article–Husky.
Italy–Multicolor Injection Molding Machine–Remu.
Italy–Presma Co–Injection Structural Foam–Presma.
Italy–Rotary Table Details–Presma.
Canada–3 pg article–Husky.
Germany–Detec LSR Rotary Table, Injection Moulding Unit.
Germany–Multi–Colour/Multi–Component Injection Moulding Machines.
Germany–Rotary Table Injection Moulding Machines–Klockner Desma.

(List continued on next page.)

*Primary Examiner*—Tim Heitbrink
*Attorney, Agent, or Firm*—Stetina Brunda & Buyan

[57] ABSTRACT

The present invention has a multi-station molding system formed having a upper housing segment and a lower housing segment which are interconnected by a plurality of elongate guide and support rails and a central support column. The upper and lower housing segments may optionally be formed of pie-shaped segments which are symmetrically spaced in an abutted, side-by-side orientation. The segments can be fabricated and/or mechanically linked as desired to provide two, three, four, five, six, or more work stations within the system. A plurality of independently movable platens are mounted between the upper and lower housing segments and are each affixed to a cylinder lift to reciprocate the movable platens toward and away from the upper housing segment. Each of the stations are provided with a mold, the male portion of which is typically affixed to the rotatable mold carrier that is attached to the upper housing segment and the female portion of which is typically affixed to the vertically movable platen. The upper housing segment is provided with a rotary table which rotates about the central column such that the plural injection molding units may be positioned at each one or selected ones of the stations to effect the injection molding process with selected molds. Each of the injection units may be provided with a different thermoplastic material and/or different color as desired.

13 Claims, 2 Drawing Sheets

OTHER PUBLICATIONS

Taiwan–Automatic Rotary Type Triangular, Quadrangle . . . –Lien Fa.
Taiwan–VH Series H–Frame Vertical Clamp Injection . . . –Multiplas.
England–Rotary Insert Moulding Press–Peter Dolan.
Japan–Greatly Improved Production . . . –Nissei.
Austria–Tie–Bar–Less with Rotary Table–Engle.
U.S.–Insert Molding Machine–Autojectors.
U.S.–WH–30–S & HR–75–S at 120–Autojectors.
France–Plastinsert (Vert inject).

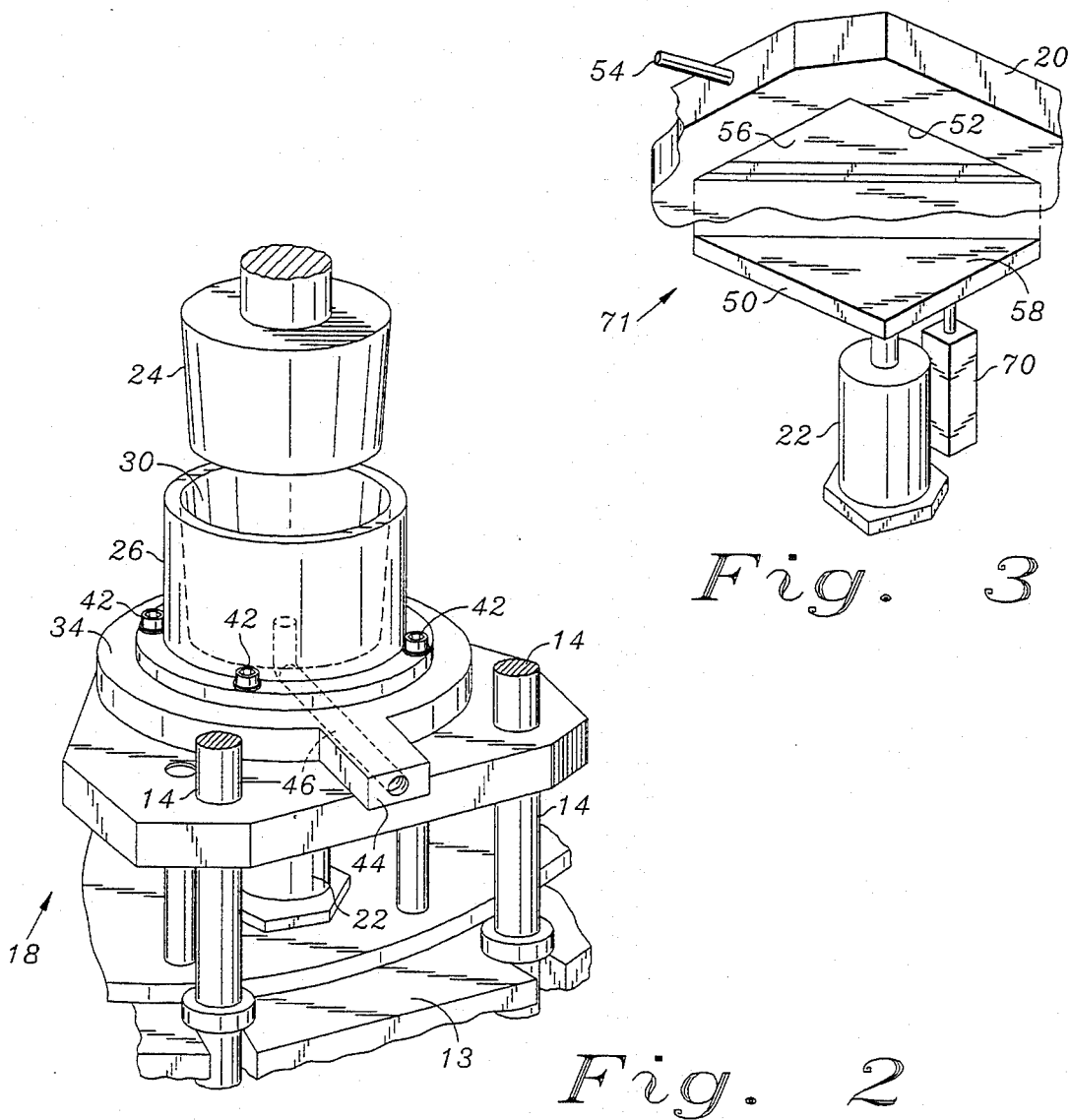
Fig. 3
Fig. 2
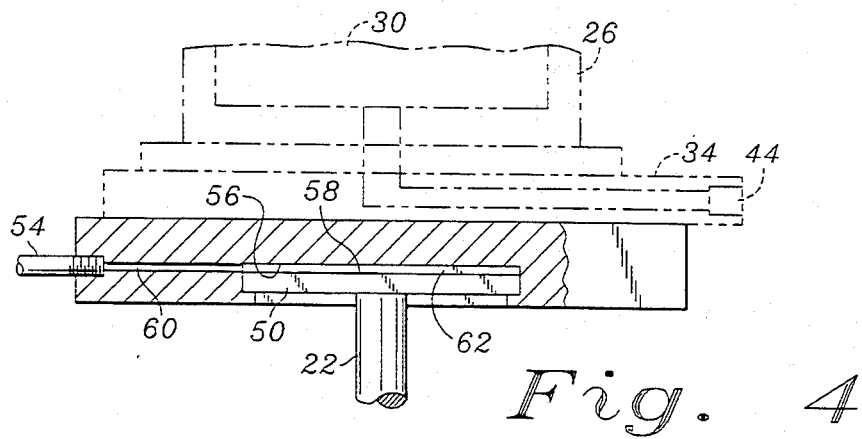
Fig. 4

MULTI-STATION INJECTION MOLDING APPARATUS

FIELD OF THE INVENTION

This invention relates generally to an apparatus and method for the injection molding of articles from a thermoplastic or similar material, and more particularly to an apparatus and method for providing a plurality of mold or work stations with a rotary mold carrier wherein the clamping pressure, stroke, molds, and injected material are independently variable among stations such that products comprised of a plurality of different plastic materials and/or different colors can be produced therewith.

BACKGROUND OF THE INVENTION

Injection molding apparatus for forming products from molten thermoplastic materials and the like are well known. Contemporary injection molding apparatus generally comprise a two-section mold wherein one of the mold sections is stationary and has an opening for receiving the molten thermoplastic material into a mold cavity defined by the two mold sections in the shape of the product to be formed thereby. The other mold section is movable between an open position away from the stationary mold section and a closed position wherein the two mold sections are in abutted engagement to define the mold cavity.

When molten thermoplastic material is injected under high pressure into the mold cavity, a product is thus formed which conforms in shape to the mold cavity. Upon cooling, the formed product is removed from the mold. Movement of the movable mold section away from the stationary mold section to the open position typically results in the actuation of an ejector which causes the product to be ejected from the mold.

It is also known to utilize a plurality of stations wherein separate injection molding apparatus are utilized to sequentially form separate portions of more complex products, typically utilizing different thermoplastic materials and/or different colors. The product is moved from one station to another to form subsequent portions thereof. A robot arm is typically required to transfer the product from station to station.

Conventional injection molding machines typically utilize a linear action wherein the movable mold section travels in a reciprocating, typically horizontal, linear motion toward and away from the stationary mold section. However, it is also known to utilize a rotary table wherein a plurality of movable molds rotate between stations, one of the stations being an injection station and thus having a port for injecting molten plastic into the mold positioned at that station.

Examples of such rotary injection molding apparatus are provided in U.S. Pat. No. 3,407,443, issued on Oct. 29, 1968, to Beebee et al.; U.S. Pat. No. 3,806,296, issued on Apr. 23, 1974, to Aoki; U.S. Pat. No. 4,424,015, issued on Jan. 3, 1984, to Black et al.; and U.S. Pat. No. 4,613,475, issued on Sep. 23, 1986, to Hettinga. Each of these prior art devices utilize a rotary table having a plurality of molds attached thereto, thus defining a plurality of stations which sequentially engage an injection unit to effect injection molding. Thus, only a single station is being used in the injection molding process at a given time.

Additionally, these prior art devices are generally constrained to be used with stations having identical clamping pressures, strokes, and thermoplastic materials. However, such operation places severe limitations upon the operational capabilities of the rotary injection molding apparatus. By restricting injection molding to a single station at a time, output is considerably restricted. Likewise, by generally requiring that the clamping pressure, stroke, and thermoplastic material utilized be the same for each station, flexibility is considerably reduced.

As such, in view of the shortcomings of the prior art, it is desirable to provide a rotary injection molding device wherein each station may be simultaneously utilized in an injection molding process and wherein the clamping pressure, stroke, and thermoplastic material are variable from station to station as desired. It is further desirable to retain the mold oriented position of the finished ejected product.

SUMMARY OF THE INVENTION

The present invention specifically addresses and alleviates the above-mentioned deficiencies associated in the prior art. More particularly, the present invention comprises a multi-station molding system formed having a upper housing segment and a lower housing segment which are interconnected by a plurality of elongate guide and support rails and a central support column. The upper and lower housing segments may optionally be formed of pie-shaped segments which are symmetrically spaced in an abutted, side-by-side orientation. The segments can be fabricated as desired to provide two, three, four, five, six, or more work stations within the system. A plurality of independent movable platens are mounted between the upper and lower housing segments and are each affixed to a cylinder lift to reciprocate the movable platens toward and away from the upper housing segment.

Each of the stations are provided with a mold, the male portion of which is typically affixed to a mold carrier and the female portion of which is typically affixed to the vertically movable platen. The upper housing segment is provided with a rotary mold carrier which rotates about the central column such that plural injection molding units may be positioned at each one or selected ones of the stations to effect the injection molding process with selected molds. Each of the injection units may be provided with a different thermoplastic material and/or different color as desired.

In operation, the plural lower mold halves are mounted to the movable platens and complimentary plural upper mold halves are mounted to the rotary mold carrier attached to the upper housing segment. Selected cylinder lifts are actuated, thus causing one or more of the movable platens to reciprocate upwardly to close their respective molds. With the molds closed, their associated plastic injection units are actuated to cause molten plastic material to enter therein.

As will be recognized, this injection molding process can occur at all stations simultaneously or only occur at selected stations as desired. Additionally, as will be recognized, due to the independence of the cylinders associated with each of the movable platens, the clamping pressure, stroke, and cylinder position relative to the mold, as well as the mold configuration, at each work station may be independently controlled and monitored as desired.

Following injection, the plastic is conditioned, i.e. by heat, cooling, injection parameters, etc. Subsequently, the cylinder lifts and clamp cylinders are deactivated, causing the movable platens to reciprocate downwardly.

With the movable platens disposed in this lowered position, the rotary mold carrier affixed to the upper housing segment is activated, thus causing all of the upper mold halves affixed to the rotary carrier to be rotated to an adjacent or other desired work station. During this rotation, the molded part previously injected into the mold is preferably maintained upon the upper half, i.e. male mold half, so as to be transferred to the next work station. Subsequently, the cylinder lifts may again be actuated, causing one or more of the mold halves to close and an additional injection of plastic material to be initiated. In this manner, a plurality of thermoplastic materials and/or colors may be sequentially utilized to form the workpiece.

As will be recognized, one or more of the stations may be segregated to perform various non-molding tasks, either before any injection, during the injection, between injections, or upon completion of all injection functions. These tasks may include: positioning of inserts; direct air cooling and/or liquid cooling, i.e., immersing; labeling; decoration; blow molding; compression molding; assembly of parts; etc.

As will be recognized, this procedure may be repeated for each of the stations within the apparatus whereby single and multiple injection molding of a single article, plus any processing tasks as desired, can be effectuated without the use of robotic arms or removal of the part from the apparatus. As will additionally be recognized, one or more of the stations may be segregated as an ejection station, wherein the completed molded part is ejected from the apparatus.

This ejection can take place even when any or all of the other molds are closed. Ejection typically releases the part downwardly such that nestable parts may be self-stacked and most fabricated parts can be deposited onto a conveyor so as to avoid losing their orientation with respect to the mold. As will be recognized, this oriented ejection can be accomplished without the use of expensive robots, mechanisms, or labor. Such oriented ejection facilitates further manipulation of the part, particularly when utilizing automated processes.

These, as well as other, advantages of the present invention will be more apparent from the following description and drawings. It is understood that changes in the specific structure shown and described may be made within the scope of the claims without departing from the spirit of the invention.

BRIEF DESCRIPTION OF THE DRAWINGS

FIG. 2 is a perspective view of a single station of the multi-station molding system of the present invention of FIG. 1;

FIG. 3 is a perspective view of the actuator base and lower surface of the platen of the station of FIG. 2;

FIG. 4 is a cross-sectional view of the actuator base and platen of FIG. 3; and

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

Figure 1:
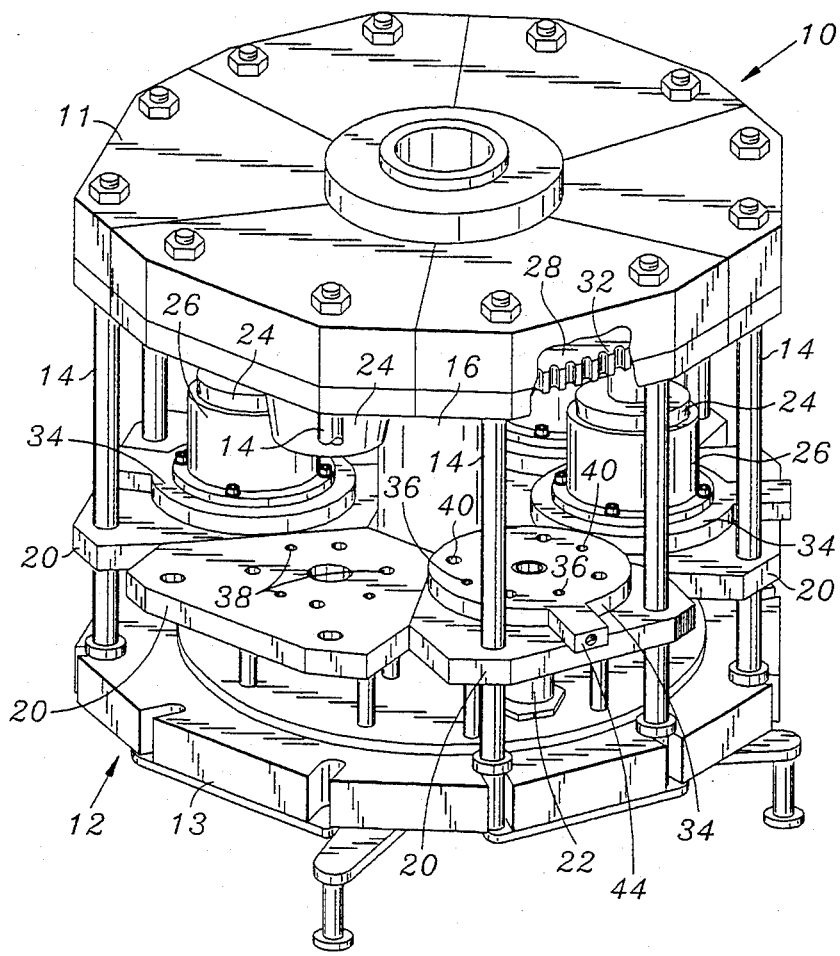
FIG. 1 is an overall perspective view of the multi-station molding system of the present invention.

The multi-station molding system of the present invention is illustrated in FIGS. 1 through 5 which depict a presently preferred embodiment of the invention. Referring now to FIGS. 1 and 2, the multi-station molding system is generally comprised of a upper housing member 10 and a lower housing member 12 which are interconnected by a plurality of elongate guide and support rails 14 and a central column 16. The central column 16 preferably has a substantially greater diameter than the guide and support rails 14. The upper 10 and lower 12 housing members are preferably formed of plural upper 11 and lower 13 pie-shaped portions which are symmetrically spaced and abutted in a circular side-by-side orientation. Each corresponding pair of upper 11 and lower 13 pie-shaped portions, taken together with their associated rails 14, define a plurality of individual work stations 18 (shown in FIG. 2).

A plurality of independent movable platens 20 are mounted between each corresponding pair of upper 11 and lower 13 pie-shaped portions. Each independently movable platen 20 is affixed to a cylinder lift or actuator 22 (as best shown in FIG. 3) to effect vertical reciprocation of each platen 20 toward and away from its associated upper housing portion 11.

By way of example and not by way of limitation, each station 18 is provided with a mold, the male portion or half 24 of which is preferably affixed to the mold carrier member 28 and the female portion or half 26 of which is preferably affixed to the vertically movable platen 20. The male mold half 24 is received within a cavity 30 defined by the female mold half 26 such that the male 24 and female 26 mold halves mate to define the product to be formed therein.

The upper housing member 10 is provided with a rotary mold carrier 28, having teeth 32 preferably formed about the periphery thereof. The rotary mold carrier 28 rotates about the central column 16 and is preferably attached thereto via bearings (not shown). A drive means, preferably an electrical or hydraulic motor (not shown), engages the teeth 32 and effects rotation of the rotary mold carrier 28 such that the male mold halves 24 attached to the mold carrier 28 therethrough may be selectively and progressively moved from station to station. Those skilled in the art however will recognize that other rotational drive mechanisms are contemplated herein for the rotary table.

The male 24 and female 26 mold halves are preferably formed such that the workpiece remains upon the male mold half 24 when the male 24 and female 26 mold halves separate. Thus, rotation of the rotary mold carrier 28 allows selected ones of the workpieces to be positioned at selected ones of the female mold halves 26 as desired. This facilitates the injection molding of various different plastic materials and/or different colors at each station, each different material and/or color generally corresponding to a different portion of the workpiece. Thus, workpieces comprised of various different plastic materials and/or colors may be readily and inexpensively manufactured thereby.

Intermediate each female mold half 26 and its associated expandable clamp platen 20 is optionally disposed manifold 34 which facilitates flow of the molten thermoplastic material from the injection molding machine. The molten plastic material is received by orifice 44 formed at the periphery or top of the manifold 34. Molten thermoplastic travels from the injection molding unit through fluid conduit 46 into the cavity 30 of the mated male 24 and female 26 mold halves. Alternatively, the molten plastic material may be received directly by either the male 24 or female 26 mold half, preferably the female mold half 26 or by the platen 20. The manifold 34 is attached to the platen 20 via fasteners (not shown), preferably bolts, which pass through through-holes 36 in the manifold 34 and into threaded holes 38 formed in the platen 20. The female mold half 26 similarly attaches through threaded holes 40 formed in the manifold 34 via fasteners, preferably bolts 42.

Referring now to FIGS. 3 and 4, the multi-station molding system of the present invention preferably utilizes a two-stage actuator for moving the platen 20 upward to effect mating of the male 24 and female 26 mold halves. The first or primary stage comprises a low pressure, i.e. preferably approximately 500 psi, lift actuator 22 having a suitable stroke for moving the platen 20 throughout its desired range of motion. A second stage, attached to the first stage, operates at high pressure, i.e. 500 to 5,000 psi, to provide the desired mating pressure of the male 24 and female 26 mold halves to assure leak and flash-free operation thereof.

The second stage is a platen actuator 71 which comprises a triangular piston 50 formed upon the distal end of the lift actuator 22 which is received within a complimentary triangular cylinder 52 formed within the lower surface of the platen 20. The use of such a triangular piston provides the critical 3-point stabilization necessary to keep the platen 20 level during the clamping process and to provide uniform pressure across the platen surface. The stroke of the second stage or platen actuator 71 needs only be sufficient to insure high pressure engagement of the male 24 and female 26 mold halves and is preferably approximately 0.050 inch. Hydraulic fluid is applied to the platen actuator 71 via port 54.

Thus, the lift actuator 22 positions the platen 20 such that the male 24 and female 26 mold halves are in non-contacting abutting relationship. The high pressure platen actuator 71, comprised of the triangular piston 50 and the triangular cylinder 52 are then utilized to achieve leak and flash-free engagement.

Prior to high pressure engagement of the male 24 and female 26 mold halves via the platen actuator 71, a thin layer of oil is disposed between the upper surface 58 of the piston 50 and the lower surface 56 of the platen 20 which defines the triangular cylinder 52 such that the platen actuator 71 is pressurized at approximately eight pounds. By maintaining this low pressure within the platen actuator 71 during the process of mating the male 24 and female 26 mold halves, the male 24 and female 26 mold halves mate gently and mold wear is thus mitigated.

Mechanical locks, preferably stops, blocks, or wedges configured to be positioned intermediate the triangular piston 50 and the base to which the proximal end of lift actuator 22 is attached, prevent refraction of the lift actuator during pressurization of the platen actuator 71 at high pressure, i.e. approximately 500–5,000 psi. Thus, the stops, blocks, or wedges lock the lift actuator 22 in the extended position when the platen actuator is pressurized.

A spring counterbalance 70, preferably having adjustable tension, may optionally be attached to the piston 50 of the platen actuator 71 or to the platen 20 to compensate for the weight of comparatively heavy molds and/or platens. The optional spring counterbalance 70 supports at least a portion of the weight of the mold and/or platen such that the full effectiveness of the lift actuator 22 and/or platen actuator 71 is achieved by pressurization thereof. Such weight compensation thereby reduces the required working pressure of the lift actuator 22, thus allowing the use of larger, heavier molds with existing hydraulic systems. Those skilled in the art will recognize that various spring, air bag, and counterweight apparatus are suitable for use as spring counterbalance 70.

Figure 5:
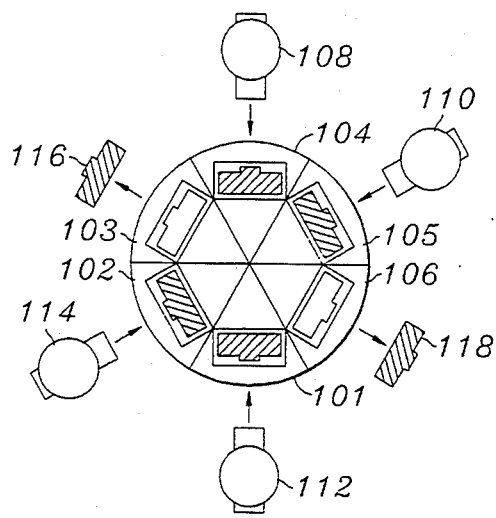
FIG. 5 is a schematic representation of a multi-station molding system according to the present invention utilizing six individual stations.

Referring now to FIG. 5, operation of the multi-station molding system of the present invention is schematically illustrated, which, by way of example only and not by way of limitation, is configured to include six stations 101–106 utilized to define two separate, independent assembly lines, each capable of forming a separate, different product, if desired. In this configuration of the invention, two of the stations 103 and 106, where injection molding is not performed, are defined as ejection stations where the workpiece is removed or ejected from the mold. Thus, with the four injection molding stations 101, 102, 104, and 105 and two ejection stations 103 and 106, as illustrated, two different assembly processes for either identical or different products may be performed simultaneously. That is, two injection molding stations 101 and 102 and one ejection station define a first assembly line while the remaining two injection molding stations 104 and 105 and the remaining ejection station 106 define an independent second assembly line.

Thus, a first workpiece may be formed at stations 101 and 102 by injection molding a first portion thereof from a first thermoplastic material and/or first color at station 101 and subsequently injection molding a second portion thereof from a second thermoplastic material and/or second color at station 102. The part is then ejected at station 103. Simultaneously, the same or a different product can be fabricated via the same or different steps at stations 104 and 105, and then ejected at station 106.

In operation, the male mold halves 24 mounted to the rotary mold carrier 28 engage the female mold halves 26 mounted to the vertically movable platen 20, typically by simultaneously pressurizing each of the actuators 22 to position each of the platens 20 in its uppermost position. This is preferably accomplished utilizing the optional platen actuator 71 defined by the triangular piston 50 and the triangular cylinder 52 pressurized to approximately 8 psi such that the male 24 and female 26 mold halves gently abut or kiss. This soft touch mating substantially increases mold life. Mold life is substantially increased by avoiding the hard contact experienced by prior art molds wherein full pressure is applied to the actuator effecting mating of the mold halves.

As the lift actuator 22 moves the platen 20 upward such that the male 24 and female 26 mold halves mate, the higher pressure of the lift actuator 22 overcomes the lower pressure of the platen actuator 71, i.e. approximately 8 psi, such that the platen actuator 71 is urged into a substantially retracted configuration. The actuators 22 are then locked in position, preferably by mechanical means, and the optional triangular platen actuator 71 is pressurized to approximately 500–5,000 psi to effect closure of the male 24 and female 26 mold halves. The mechanical locking means preferably comprises stops, blocks, or wedges which are automatically, i.e., via actuators, positioned intermediate each piston 50 and a base or fixed member (not shown) to prevent retraction of the lift actuator 22 when the platen actuator 71 is pressurized. If the optional triangular platen actuator 71 is not utilized, then the actuators 22 effect tight engagement of the male 24 and female 26 mold halves.

The pressure of the lift actuator 22 and the triangular platen actuator 71 may vary from station to station such that optimum mold life is achieved with substantially flash-free operation. Thus, it is not necessary to use excessive pressure upon those molds not requiring such pressure, thereby resulting in premature wear of the molds. Indeed, any actuators associated with stations not being used need not be pressurized at all. Once the male 24 and female 26 mold halves are mated, the molten plastic material of each associated injection molding machine is received by the corresponding orifice 44 of each manifold 34 and molten thermoplastic or the like is forced into the cavity defined by the male 24 and female 26 mold halves. The female mold half 26 defines only those portions of the workpiece which are to be formed at that particular work station.

To effect separation of the male 24 and female 26 mold halves, the platen actuator 71 is depressurized such that the male 24 and female 26 mold halves slightly separate or lightly abut. That is, tension is removed from the lift actuator 22, platen actuator 71, and male 24 and female 26 mold halves even though the cylinder 22 remains pressurized. Removing tension thus allows the locks, i.e. steps, blocks, or wedges, to be removed such that the lift actuator 22 can be retracted to its original position and the platen actuator 71 pressurized to approximately 8 psi in anticipation of the next cycle of the molding process.

Thus, when the male 24 and female 26 mold halves separate and the rotary mold carrier 28 rotates the male mold half 24 and the workpiece to the next station, further portions of the workpiece may be formed at that next station in an analogous fashion.

It is understood that the exemplary multi-station molding system described herein and shown in the drawings represents only a presently preferred embodiment of the invention. Indeed, various modifications and additions may be made to such embodiment without departing from the spirit and scope of the invention. For example, although two-part, single-cavity molds are illustrated and described as the presently preferred embodiment of the present invention, those skilled in the art will recognize that various other configurations (i.e. multiple-part, multiple-cavity molds) are likewise contemplated. Thus, these and other modifications and additions may be obvious to those skilled in the art and may be implemented to adapt the present invention for use in a variety of different applications.

Additionally, it will be understood that the multi-station injection molding system of the present invention may be configured as desired so as to vary the number of independent work stations positioned on the apparatus. Additionally, each of the work stations may be user configured to provide alternative assembly labeling or molding task. Further, it will be recognized that although in the preferred embodiment injection molding units are contemplated for use with the present invention, other molding techniques, such as blow molding, smash molding, and the like, are contemplated herein and fall within the spirit of the present invention.

What is claimed is:

1. A molding apparatus for forming a workpiece from a plurality of materials and colors, said molding apparatus comprising:
   a) a plurality of first and second mold portions, said first and second mold portions mating to define a corresponding plurality of mold cavities;
   b) a rotary plate to which said first mold portions are attached such that they rotate therewith among said second mold portions;
   c) an independent actuator attached to each of said second mold portions for selectively positioning said second mold portions in mating contact with said first mold portions and for positioning said second mold portions away from said first mold portions;
   d) a spring counterbalance attached to at least one of said second mold portions to compensate for the weight thereof; and
   e) wherein the use of independent actuators for each of said second mold portions facilitates the mating of each second portion to each first mold portion at pressures different from one another.

2. The molding apparatus as recited in claim 1 wherein said first mold portion comprises a male mold portion and said second mold portion comprises a female mold portion.

3. The molding apparatus as recited in claim 2 wherein the workpiece remains attached to said male mold portion when said male and female mold portions separate.

4. The molding apparatus as recited in claim 1 further comprising a platen actuator for increasing the force with which said first and second mold portions mate by applying force to a platen of each second mold portion, one of said independent actuators being associated with each platen.

5. The molding apparatus as recited in claim 4 wherein said platen actuator comprises:
   a) a triangular cylinder formed upon one of a platen and an associated actuator;
   b) a complimentary triangular piston formed upon the other of said platen and a corresponding actuator received within said triangular cylinder; and
   c) wherein said triangular piston provides stable support to said platen when said corresponding actuator is pressurized.

6. The molding apparatus as recited in claim 1 wherein each of said actuators has an independently adjustable stroke.

7. A molding apparatus for forming a workpiece from a plurality of materials and colors, said molding apparatus comprising:
   a) a plurality of rotating first mold portions and non-rotating second mold portions, said first and second mold portions mating to define a corresponding plurality of mold cavities;

b) a rotary plate to which said first mold portions are attached to facilitate rotation thereof among said non-rotating second mold portions;

c) an independent actuator attached to each of said second mold portions for selectively positioning said second mold portions in mating contact with said first mold portions and for positioning said second mold portions away from said first mold portions; and d) wherein the use of independent actuators for each of said second mold portions facilitates the mating of each second mold portion to each first mold portion at different pressures from one another.

8. The molding apparatus as recited in claim 7 wherein said first mold portion comprises a male mold portion and said second mold portion comprises a female mold portion.

9. The molding apparatus as recited in claim 8 wherein the workpiece remains attached to said male mold portion when said male and female mold portions separate.

10. The molding apparatus as recited in claim 7 further comprises a platen actuator for increasing the force with which said first and second mold portions mate by applying force to a platen of each second mold portion, one of said independent actuators being associated with each platen.

11. The molding apparatus as recited in claim 10 wherein said platen actuator comprises:

a) a triangular cylinder formed upon one of a platen and an associated actuator;

b) a complimentary triangular piston formed upon the other of said platen and a corresponding actuator received within said triangular cylinder; and c) wherein said triangular piston provides stable support to said platen when said corresponding actuator is pressurized.

12. The molding apparatus as recited in claim 7 wherein each of said actuators has an independently adjustable stroke.

13. The molding apparatus as recited in claim 7 further comprises spring counterbalances attached to said second mold portions to compensate for the weight thereof.

* * * * *